Nov. 23, 1948.  J. T. McNANEY  2,454,519
COMBINATION STEP-BY-STEP AND INDUCTION MOTOR
Filed Sept. 26, 1946
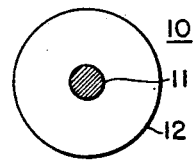
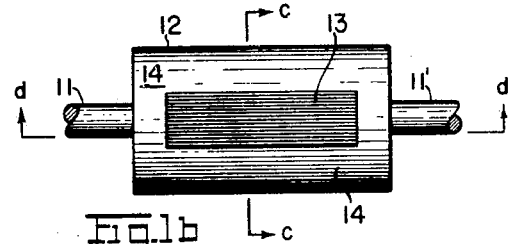
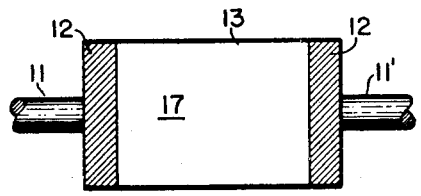
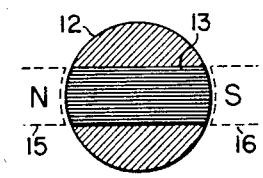
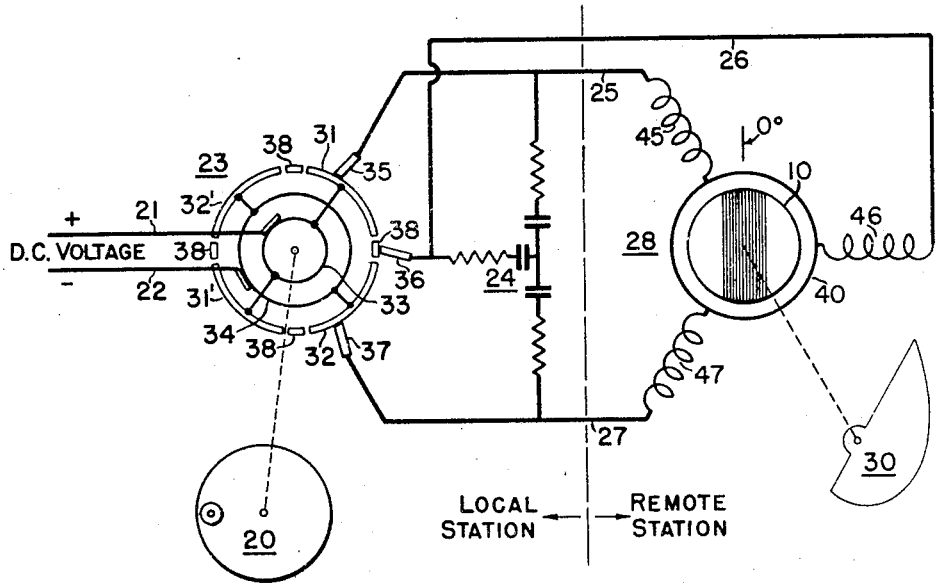
FIG. 2
Inventor
JOSEPH T. McNANEY
By Robert T. Killman
Attorney Patented Nov. 23, 1948

2,454,519

UNITED STATES PATENT OFFICE 2,454,519

COMBINATION STEP-BY-STEP AND INDUCTION MOTOR

Joseph T. McNaney, Baltimore, Md., assignor to Bendix Aviation Corporation, Towson, Md., a corporation of Delaware Application September 26, 1946, Serial No. 699,460

10 Claims. (Cl. 318—27)

1

This invention relates to motors having response characteristics typical of both step-by-step and induction motors, the character of the response depending upon the speed of rotation of the direct current controlled field. The invention also relates to a rotor construction which provides these characteristics.

Usually a motor needs to meet but one requirement, either of speed or of orientation. In some instances, however, it is desirable that a motor function at times as a step-by-step drive in strict synchronism with a control means and at other times as an induction motor when the speed is beyond the limit of step-by-step action. It is an object of this invention to provide such a motor.

A further object of this invention is to provide a rotor which assumes a definite orientation with respect to the controlled magnetic field of a direct current motor.

Another object of this invention is to provide such a rotor having a laminated core which is not broken by a supporting shaft.

It is a further object of this invention to provide a rotor of such construction that the core supporting body provides a shorted turn through which current flow may be induced to reinforce a magnetic field through the core.

Still another object of this invention is to provide such a rotor consisting of material such as aluminum whose large and smooth uninterrupted surface area is conducive to the eddy currents desirable for rotation by induction.

It is a still further object of this invention to provide means for the remote tuning of a receiver, which is operable at rates of voltage variation high enough to allow tuning gear ratios sufficient to permit tuning of a receiver in very fine steps.

The objects and advantages of the invention are attained by the provision of a cylindrical aluminum rotor having a slot, preferably of rectangular cross-section, extending diametrically therethrough, with one of its cross-sectional dimensions paralleling the axis of the rotor. A core, composed of laminations of highly permeable metal, occupies and fills the slot, the laminations paralleling the axis of the rotor.

These and other objects will become apparent from a consideration of the following specification when taken in conjunction with the accompanying drawing in which:

Fig. 1a is an end view, 1b a side view, and 1c and 1d are cross-sectional views of a rotor embodying the invention, and

2

Fig. 2 is a schematic diagram of one system in which the rotor of Fig. 1 is used to provide a motor and a receiver tuning means embodying the invention.

Fig. 1a shows a rotor 10 with a shaft 11 centrally located at the end of a cylindrical body 12. A shaft 11' similar to shaft 11 is mounted on the opposite end of the cylindrical body and both serve to establish the position with respect to the stator armature in which the rotor freely revolves.

Fig. 1b is a side view of the rotor consisting of shafts 11 and 11', cylindrical body 12 and core 13. The smooth aluminum surface 14 provides the area on which the armature field reacts to provide induction-motor action at high speeds.

Fig. 1c is a cross sectional view taken along line c—c of Fig. 1b and reveals the laminated core 13 extending all the way through the cylindrical body and machined together therewith to form a complete cylindrical surface. Said core comprises numerous sheets of highly permeable metal which serve to align the rotor with the defined position of the armature field when stationary or when rotating at slow speeds. Two ghost magnetic poles 15 and 16 indicate the definite magnetic field of the armature winding.

Fig. 1d is a cross-sectional view taken along line d—d of Fig. 1b showing the surface area 17 of one lamina of the core 13 after it is inserted into the body 12 of the rotor. The core is retained by the adhesion and pressure established by high pressure impregnation with a binding agent after the core has been inserted into the body cavity prepared for it.

Fig. 2 shows, by way of example, a remote control system employing the rotor of Fig. 1 and comprising a mechanical drive 20, a direct current voltage source 21, 22, a commutator 23, a filter circuit 24, leads 25, 26 and 27, a motor 28, and a condenser plate 30 typifying a mechanical load. The mechanical drive 20 may be any means for causing rotary motion, being represented here by a crank. The commutator 23 is constructed with an even number of active segments 31, 31' and 32, 32', etc., alternately connected to slip rings 33 and 34 respectively, which are energized from leads 21 and 22 respectively. Interposed between all active segments are small inactive segments 38 which are one-fifth the arc size of the active segments. Brushes 35, 36 and 37 are positioned about the commutator with an arc separation equal to two-thirds the combined arc distance occupied by an active and an inactive segment.

The motor 28 consists of the rotor 10 previously described, and a stator 40 which is the armature. Said armature includes three separate windings 45, 46 and 47 equally spaced around the armature circumference and energized through brushes 35, 36 and 37 respectively, all the windings having a common electrical termination consistent with a Y-wound, three-phase armature. The positioning of the brushes and segments about the commutator makes possible twelve separate voltage conditions with respect to the combination of three brushes, and correspondingly effects twelve consecutively positioned magnetic fields in the armature 40, which constitute its complete electrical cycle.

To better understand the operation of such a system, the step-by-step action will now be explained. The commutator of Fig. 2 contains four active segments which will provide two electrical cycles or motor revolutions per commutator revolution. Considering the position shown to be step one, and the rotor 10 at 0° rotation in compliance with the armature field, consecutive steps will be described. In the step illustrated, brush 35 energizing winding 45 is at positive potential and brush 37 energizing winding 47 is at negative potential, while brush 36, together with winding 46, is neutral. The resulting magnetic field is as shown by the position of the rotor, the permeable core of which is aligned therewith.

Should we turn the commutator clockwise by 15°, then brushes 35 and 36, together with windings 45 and 46, will be positive and brush 37 with winding 47 will be negative. The resulting magnetic field of stator 40 will be reoriented in a clockwise manner through an angle of 30° and rotor 10 will be likewise rotated to alignment. In step three, winding 45 will be neutral, winding 46 positive, and winding 47 negative.

The resulting field will extend between the energized windings 46 and 47 as poles, having been rotated by 60° from its original orientation. In step four, windings 45 and 47 will be negative since brushes 35 and 37 contact oppositely displaced segments 32' and 32 respectively. Winding 46 will be positive. The magnetic field and the rotor will now have been rotated by 90°.

The fifth step (each step involves a 15° clockwise rotation of the commutator) establishes brush 35 with winding 45 as negative, brush 36 with winding 46 as positive, and brush 37 with winding 47 at neutral potential. The field and rotor orientation will be 120° from the starting point. In step six, brush 35 will continue to contact segment 32' and winding 45 will be negative. Brush 36 together with brush 37 will contact segment 31, windings 46 and 47 will both be positive, and the magnetic field with the rotor will have been turned through 150°.

In step seven, brush 36 will again be neutral as in step one while brushes 35 and 37 will have polarities opposite from that in step one and the magnetic field will have been turned by 180°. Thus, steps seven, eight, nine, ten, eleven and twelve will be respectively identical to steps one, two, three, four, five and six, with the exception that the polarity will be reversed. Step thirteen will identify itself with step one and will start another electrical cycle.

While the motor is operating in a step-by-step fashion, the aluminum portion of the rotor, which constitutes a low resistance shorted turn around the core, has currents induced in it by the action of the armature. These currents re-enforce the magnetic field in which the core is located, thus adding to the ability of the rotor to follow the rotating stator field.

Previously known forms of step-by-step motors will function satisfactorily in synchronism with the rotation of the stator field only up to speeds within the range of 800 to 1000 R. P. M. Above this range slippage occurs to such an extent as to render the system unusable in its usual applications.

However, by the use of a rotor constructed in accordance with the invention, the performance of such systems at speeds in excess of this range is greatly improved. The motor will now operate synchronously at speeds up to 1200 R. P. M. At higher speeds, although some slippage occurs, it occurs at a constant percentage rate with constant load. Such slippage at high speeds is satisfactory for many applications.

This improved operation at high speeds is brought about by the fact that the large uninterrupted and smooth surface of the aluminum portion of the rotor is conducive to the formation of eddy currents near the rotor surface, thus enabling it to function as an induction motor at those speeds. A system such as disclosed herein has been found to function satisfactorily in this manner to speeds in excess of 6000 R. P. M.

The extension of the range of speed in which synchronous step-by-step operation is attained is due to the re-enforcement of the magnetic field in which the rotor operates, as explained above. It is further due to the absence of a supporting shaft in the rotor core, whereby the reluctance of the core is held to a minimum.

The rotor has been referred to herein as constructed of aluminum, with the exception of the core. However, it is to be understood that, while aluminum is preferred, other non-magnetic metals of light weight, low resistance, and appropriate surface qualities may be employed.

This invention is particularly adapted to the remote tuning of radio receivers for such exacting service as direction finding. For such use it is necessary that a receiver be tunable at high speeds over a wide band of frequencies, yet the tuning action must either continuously follow a manual tuning movement initiated in the remote location or must follow it in such minute steps as to insure against missing, at slow tuning speeds, a signal occurring on a frequency which lies between adjacent steps.

The use of a step-by-step remote control system for such service, particularly in the aircraft field, has been desirable for some time, due to the simplicity and light weight of the mechanism required. However, such systems have not been used, due to the fact that the motors previously known could not follow in a usable manner the variations of the control voltage at speeds high enough to allow tuning gear ratios which would provide tuning steps of the required minuteness.

The present invention eliminates this defect and provides a control system which gives excellent results in such service. In a typical successful system of this type the gear ratio between the crank and the commutator was 1:10 and that between the rotor and the condenser plate was 1200:1. In slewing, the crank may be turned four times per second, giving a commutator speed of 2400 R. P. M., and the condenser plate will thus be turned through 180° of rotation in 7.5 seconds.

On the other hand, to move the condenser plate through one degree of rotation requires 3⅓ turns of the rotor or 1⅔ turns of the commutator. This much rotation of the commutator is accomplished by sixty degrees of crank rotation, thus giving adequate fineness of tuning at slow crank speeds.

Since one rotation of the rotor is made up of 12 steps, it requires 40 steps to move the condenser plate by one degree, which means that each step of rotor movement will move the plate through one and one-half minutes of arc.

If the top speed at which the rotor would follow is 1000 R. P. M., then the top commutator speed would be 500 R. P. M. or 8⅓ R. P. S. At four crank turns per second the gear ratio between crank and commutator would be 1:2.

To move the condenser plate through 180° in 7½ seconds, the gear ratio between rotor and plate would have to be approximately 1:250. At such a gear ratio each step of the rotor movement would move the plate through 7.4 minutes of arc, thus permitting signals to be lost between steps and preventing accurate tuning to the maximum signal strength of signals that were intercepted.

While the disclosure has been restricted to the embodiment of the invention which is now preferred, many variations falling within the scope of the appended claims will occur to those skilled in the art. The invention is therefore not to be considered as restricted to the embodiment thereof disclosed herein.

What is claimed is:

1. A motor rotor comprising a cylindrical member having an opening of rectangular cross-section extending diametrically therethrough with one cross-sectional dimension of said opening parallel to the axis of said member, and a plurality of laminations of material located in said opening with the faces of said laminations extending in substantial parallelism with the faces of said opening containing said cross-sectional dimension, the material of said laminations having lower magnetic reluctance than the material of said member and the material of said member having less electrical resistivity than that of said laminations and presenting a smooth, uninterrupted, cylindrical surface except where broken by said opening.

2. A motor rotor comprising a cylindrical aluminum member having a rectangular slot extending diametrically therethrough with one of its dimensions parallel to the axis thereof and a plurality of laminations of material of low magnetic reluctance located in said slot, the faces of said laminations extending in substantial parallelism with the faces of said slot containing said dimension.

3. A motor rotor comprising a laminated core of highly permeable metal and a cylindrical core supporting member surrounding said core, said core extending diametrically through said member with the faces of said laminations extending in planes parallel to the axis of said rotor, said member being formed of material of lower electrical resistivity and higher magnetic reluctance than the material of said core.

4. A motor rotor comprising a laminated core of highly permeable metal and a cylindrical aluminum core supporting member surrounding said core, said core extending diametrically through said member with the faces of said laminations extending in planes parallel to the axis of said rotor.

5. A motor rotor comprising a laminated core of highly permeable metal and a cylindrical core supporting member surrounding said core, said core extending diametrically through said member, said member being formed of material of lower electrical resistivity and higher magnetic reluctance than the material of said core.

6. A motor rotor comprising a laminated core of highly permeable metal and a cylindrical aluminum core supporting member surrounding said core, said core extending diametrically through said member.

7. A motor comprising a hollow stator having a cylindrical inner surface, means for establishing a magnetic field rotating in a stepwise fashion within said stator, with the region of maximum strength of said field extending substantially diametrically of the cylinder defined by said inner surface, a cylindrical rotor mounted for rotation within said stator, said rotor comprising a laminated core of highly permeable metal and a cylindrical core supporting member surrounding said core, said core extending diametrically through said member, said member being formed of material of lower electrical resistivity and higher magnetic reluctance than the material of said core.

8. A motor comprising a hollow stator having a cylindrical inner surface, means for establishing a magnetic field rotating in a stepwise fashion within said stator, with the region of maximum strength of said field extending substantially diametrically of the cylinder defined by said inner surface, a cylindrical rotor mounted for rotation within said stator, said rotor comprising a laminated core of highly permeable metal and a cylindrical core supporting member surrounding said core, said core extending diametrically through said member with the faces of said laminations extending in planes parallel to the axis of said rotor, said member being formed of material of lower electrical resistivity and higher magnetic reluctance than the material of said core.

9. A motor comprising a hollow stator having a cylindrical inner surface, means for establishing a magnetic field rotating in a stepwise fashion within said stator, with the region of maximum strength of said field extending substantially diametrically of the cylinder defined by said inner surface, a cylindrical rotor mounted for rotation within said stator, said rotor comprising a laminated core of highly permeable metal and a cylindrical core supporting member surrounding said core, said core extending diametrically through said member.

10. Means for remotely tuning a receiver comprising a motor, said motor comprising a hollow stator, a cylindrical rotor mounted for rotation within said stator, said rotor comprising a laminated core of highly permeable metal and a cylindrical core supporting member surrounding said core, said core extending diametrically through said member, said member being formed of material of lower electrical resistivity and higher magnetic reluctance than the material of said core, a tuning element for said receiver, means driving said element in proportion to the movement of said rotor, and means for providing a magnetic field rotating in a stepwise fashion within said stator, the last named means comprising a source of control voltage, means applying said voltage to said stator in a manner to create a magnetic field in the space occupied by said rotor, and remotely located means for varying the application of said voltage to said stator in a manner to rotate said magnetic field.

JOSEPH T. McNANEY.

(References on following page)

REFERENCES CITED

The following references are of record in the file of this patent:

UNITED STATES PATENTS

| Number | Name | Date |
|---|---|---|
| 1,551,271 | Slepian | Aug. 25, 1925 |
| 1,807,001 | Methlin | May 26, 1931 |
| 1,915,655 | Eisemann | June 27, 1933 |

FOREIGN PATENTS

| Number | Country | Date |
|---|---|---|
| 361,515 | Germany | Oct. 16, 1922 |